(12) United States Patent
Young

(10) Patent No.: US 8,196,886 B2
(45) Date of Patent: Jun. 12, 2012

(54) SAW BLADE GRIPPER

(75) Inventor: Richard E. Young, Lancaster, NY (US)

(73) Assignee: REY Imaginations LLC, Lancaster, NY (US)

( * ) Notice: Subject to any disclaimer, the term of this patent is extended or adjusted under 35 U.S.C. 154(b) by 310 days.

(21) Appl. No.: 12/758,467

(22) Filed: Apr. 12, 2010

(65) Prior Publication Data

US 2011/0248142 A1 Oct. 13, 2011

(51) Int. Cl.
*A47G 1/10* (2006.01)
(52) U.S. Cl. .................................... 248/316.1
(58) Field of Classification Search .............. 248/316.1, 248/316.4, 309.1, 313, 346.06, 351
See application file for complete search history.

(56) References Cited

U.S. PATENT DOCUMENTS

| | | | |
|---|---|---|---|
| 2,469,527 A | 5/1949 | Stifflemire | |
| 3,029,663 A | 4/1962 | Thar | |
| 3,212,347 A | 10/1965 | Robeson | |
| 3,312,460 A | 4/1967 | Kaufman | |
| 3,661,312 A * | 5/1972 | Pomernacki | 227/8 |
| 3,789,680 A | 2/1974 | Blatt | |
| 3,840,157 A * | 10/1974 | Hellenkamp | 222/309 |
| 4,364,283 A | 12/1982 | Ricardo | |
| 4,473,176 A | 9/1984 | Harper | |
| 4,498,293 A * | 2/1985 | Gregory | 60/478 |
| 4,846,385 A | 7/1989 | Fratus | |
| 5,007,568 A | 4/1991 | Da Vault | |
| 5,125,324 A * | 6/1992 | Araki et al. | 91/454 |
| 5,395,100 A | 3/1995 | Stienbarger | |
| 5,857,737 A | 1/1999 | Fraser | |
| 6,641,013 B2 | 11/2003 | Dise | |
| 6,648,152 B2 | 11/2003 | Bermes | |
| 7,044,526 B2 | 5/2006 | Tweet et al. | |
| 7,290,761 B2 | 11/2007 | Siegel | |
| 2008/0164400 A1 | 7/2008 | Beechinor | |
| 2011/0203123 A1 * | 8/2011 | Holcomb | 30/382 |

* cited by examiner

*Primary Examiner* — Romon Ramirez
(74) *Attorney, Agent, or Firm* — Simpson & Simpson, PLLC

(57) ABSTRACT

A mechanism for gripping an article including a housing, a piston slidably housed within the housing, a plunger slidably housed within the housing, wherein the plunger is at least partially extendable out from the housing, the plunger including a gripping surface, at least one spring operatively arranged between the piston and the plunger for relating a change of a position of the piston to the plunger, and a cam eccentrically rotatable about an axis and operatively engaged with the piston for setting the position of the piston.

10 Claims, 6 Drawing Sheets

SAW BLADE GRIPPER

FIELD OF THE INVENTION

The invention broadly relates to gripping mechanisms, more specifically to mechanisms for gripping blades, and even more particularly to a saw blade gripper for use during transport.

BACKGROUND OF THE INVENTION

Hooks, clamps, straps, and the like are known in the art for securing items in place. These means may also be used to secure items for transport. However, these items may need to be not only securely held in place within the transportation vehicle, but also readily accessible. For example, tools and other equipment may need to be transported by construction companies, the police, firefighters, the military, and the like, such as by van, truck, boat, or plane. Durability and reliability is paramount in such transportation scenarios so that the equipment is locked in place and is not damaged or does not damage the vehicle. Also, it the equipment must not fall during transport, potentially injuring a passenger of the transport vehicle.

Some equipment, such as chainsaws or concrete saws, present an even more difficult problem in that they have large blades which protrude or extend from the main body of the tool. While the main body can be secured using traditional methods mentioned above, there is also desired a durable means of securing the blade, such as to reliably withstand the rigors of transport.

BRIEF SUMMARY OF THE INVENTION

The present invention broadly comprises a mechanism for gripping an article including a housing, a piston slidably housed within the housing, a plunger slidably housed within the housing, wherein the plunger is at least partially extendable out from the housing, the plunger including a gripping surface, at least one spring operatively arranged between the piston and the plunger for relating a change of a position of the piston to the plunger, and a cam eccentrically rotatable about an axis and operatively engaged with the piston for setting the position of the piston. In one embodiment, said piston and said plunger are concentrically aligned within said housing. In one embodiment, the mechanism further comprises a projection extending from said piston to said plunger, said projection including a head operatively arranged to lockingly engage in a slot of said plunger for setting a maximum distance between said plunger and said piston. In one embodiment, the cam is included on a shaft, and a rotation of said shaft is limited by a tang engaged in a groove in said housing. In one embodiment, said rotation of said shaft is limited to 180°, and wherein said 180° rotation of said shaft causes said cam to shift said position of said piston between an engaged position and a disengaged position. In one embodiment, said plunger includes a pad, said pad comprising said gripping surface, wherein said pad increases a coefficient of friction of said gripping surface.

The current invention also broadly comprises an apparatus for gripping a blade including a backing plate having a backing surface, a mechanism according to the above, and wherein said backing surface opposes said gripping surface of said mechanism and wherein said backing surface and said gripping surface are substantially parallel with respect to each other and form a gap for receiving an article therebetween. In one embodiment, the apparatus further comprises a hinge means for rotating said mechanism away from said backing plate for facilitating insertion of an article to be gripped between said mechanism and said backing plate. In one embodiment, the apparatus further comprises at least one rail, said mechanism slidably engaged along said rail for widening or narrowing said gap for accommodating articles of different thicknesses in said gap.

The current invention also broadly comprises an apparatus for gripping an article including a backing plate having a backing surface, a mechanism including a housing, a piston slidably housed within said housing, a plunger slidably housed within said housing, wherein said plunger is at least partially extendable out from said housing, said plunger including a gripping surface, wherein said gripping surface opposes said backing surface of said mechanism and wherein said backing surface and said gripping surface are substantially parallel with respect to each other and form a gap for receiving an article therebetween, at least one spring operatively arranged between said piston and said plunger for relating a change of a position of said piston to said plunger, and a cam eccentrically rotatable about an axis and operatively engaged with said piston for setting said position of said piston, a hinge means for rotating said mechanism away from said backing plate for facilitating insertion of an article to be gripped by said apparatus, and at least one rail, said mechanism slidably engaged along said rail for widening or narrowing said gap for accommodating articles of different thicknesses in said gap.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "grip" is synonymous with any other terms such as "grab", "hold", "clamp," etc., and such terms may be used interchangeably as appearing in the specification and claims. Also, "blade" may refer to a cutting blade of any type of saw, (concrete, circular). Furthermore, "blade" may similarly refer to any similar thin protrusion extending from the body of a tool or the like, such as the bar of a chainsaw. Although any methods, devices or materials similar or equivalent to those described herein can be used in the practice or testing of the invention, the preferred methods, devices, and materials are now described.

Figure 1:
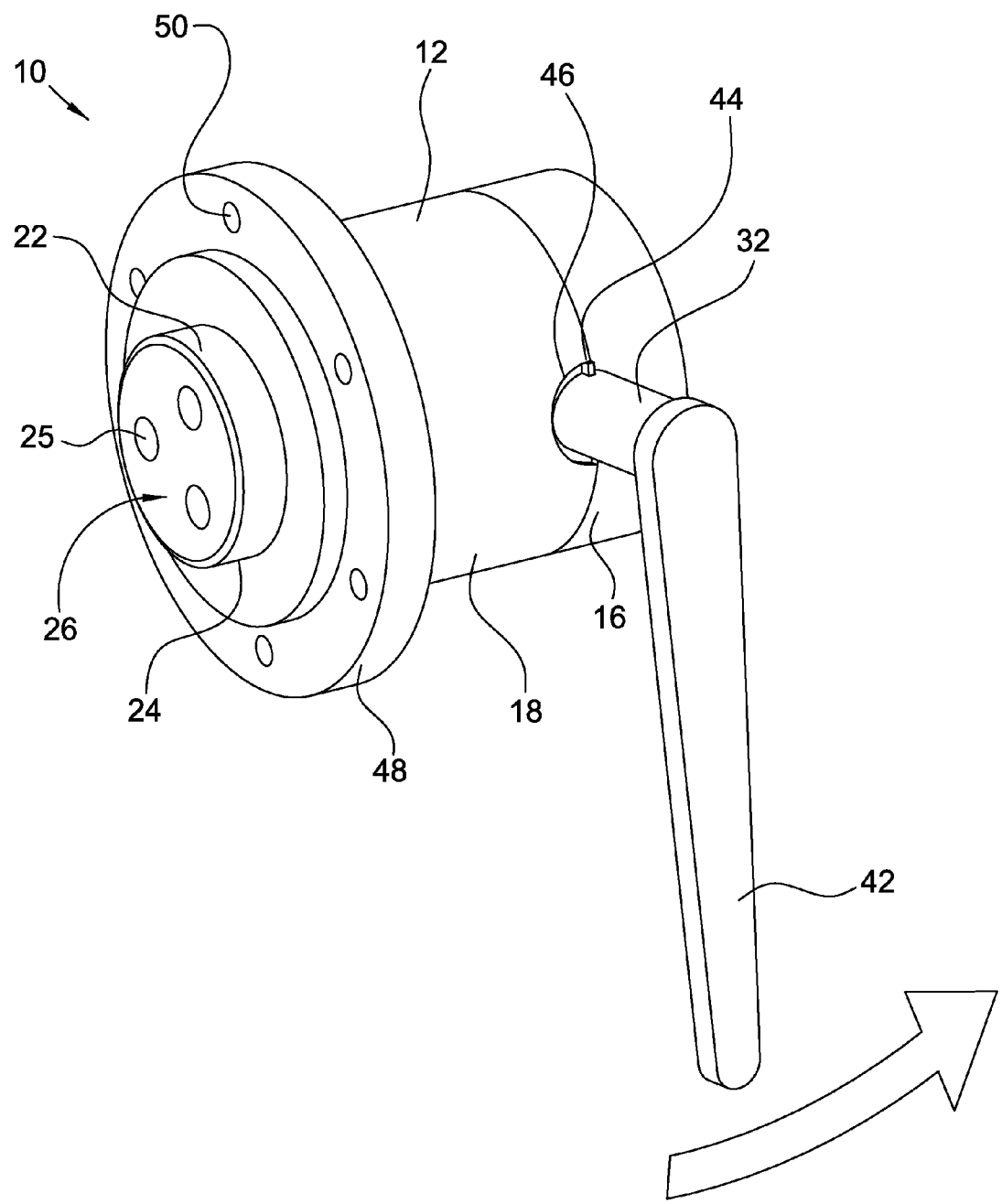
FIG. 1 is a perspective view of a gripper mechanism according to the current invention.
Figure 2A:
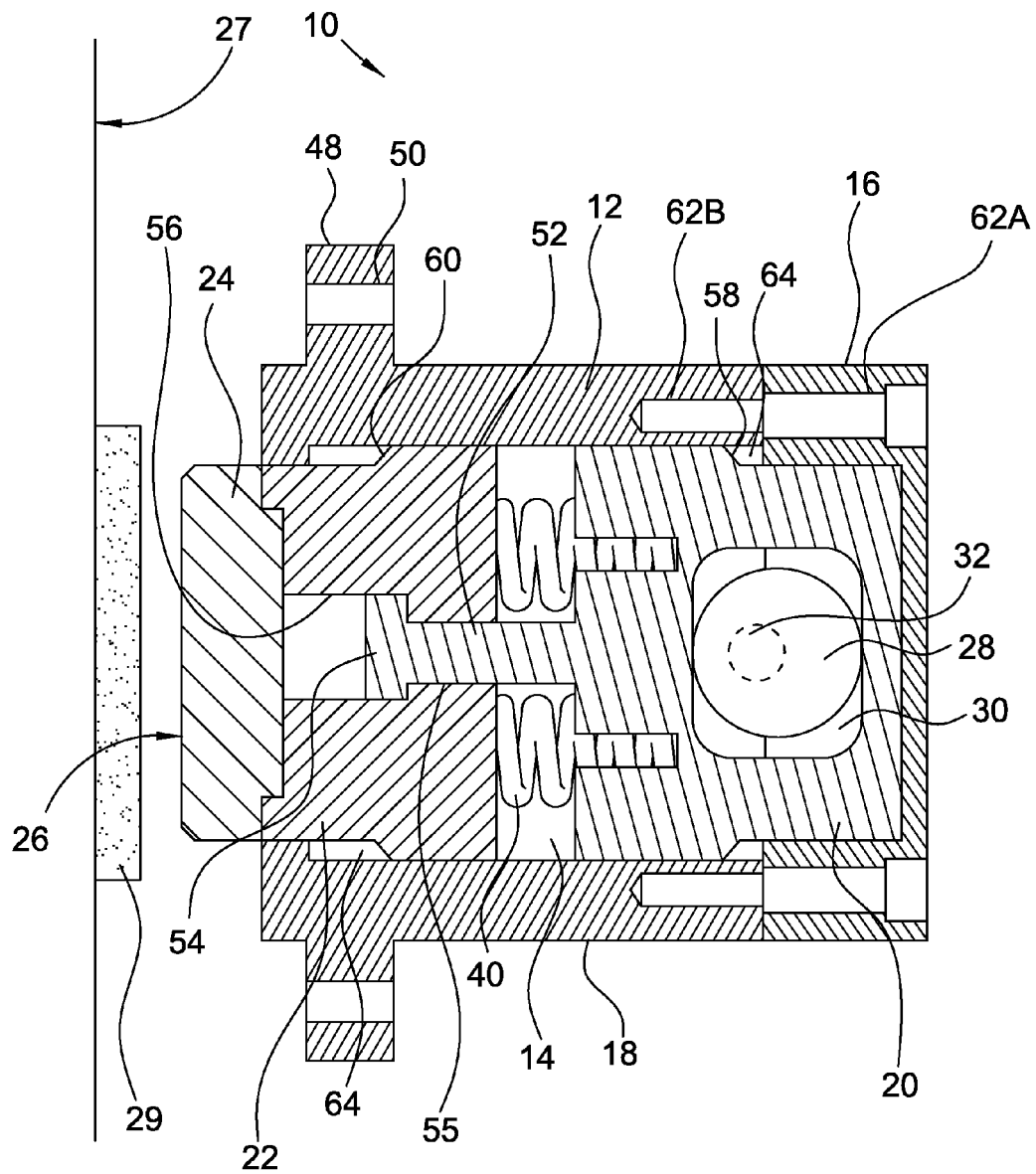
FIGS. 2A and 2B are cross-sectional views of the gripper mechanism shown in FIG. 1 in a disengaged and engaged position, respectively.
Figure 2B:
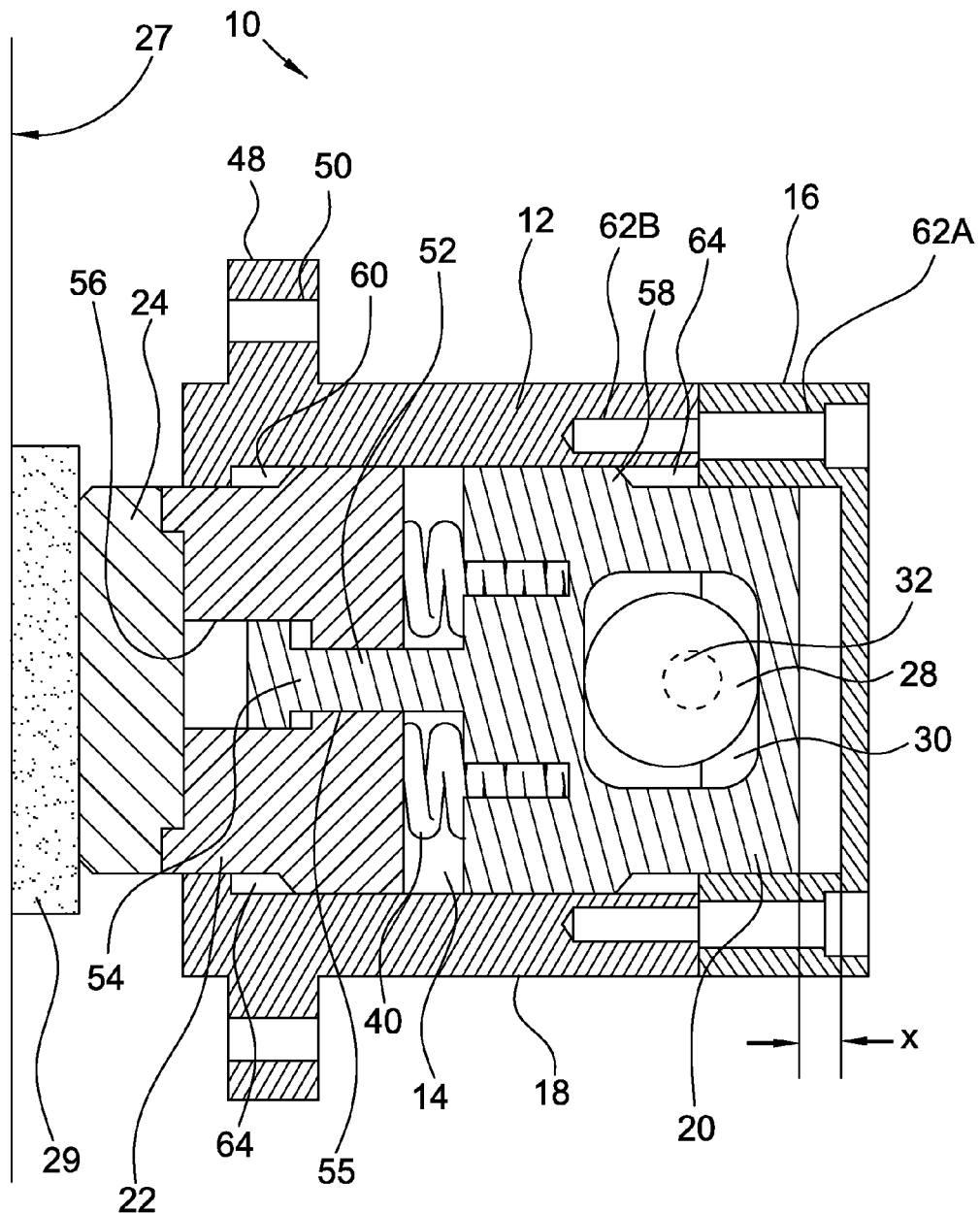
Figure 3:
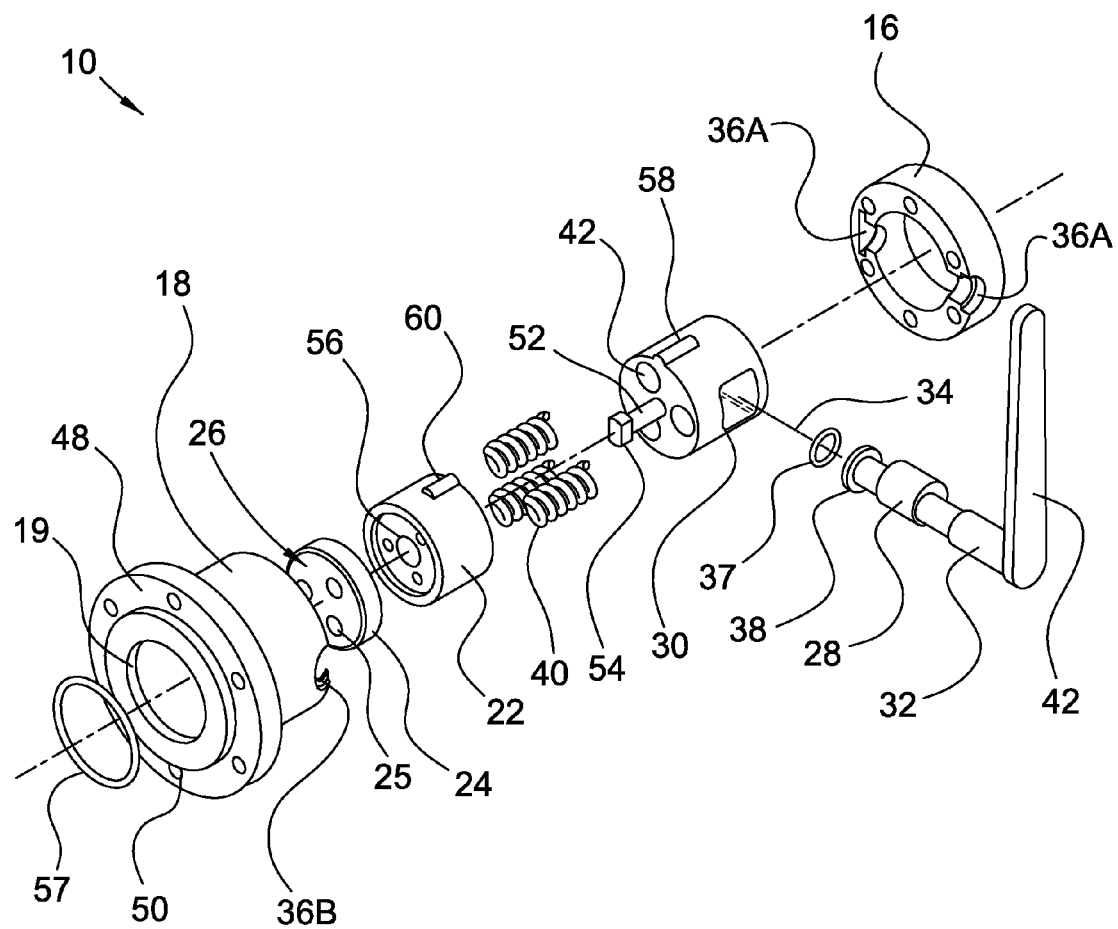
FIG. 3 is an exploded view of the gripper mechanism shown in FIG. 1.

Referring now to the figures, FIG. 1 shows a perspective view of gripper mechanism 10, a cross-section of gripper 10 is shown in FIGS. 2A and 2B, and the gripper is shown exploded in FIG. 3. Specifically, gripper 10 is arranged to be installed inside a van, truck, boat, or other moving vehicle or vessel, for supporting the blade of a tool during transport of the tool. However, it should be appreciated that the current invention could also be used to secure a blade or other article in a stationary location, such as a building. The body of the tool could additionally be supported by other means, such as straps, hooks, buckles, or the like, as is known in the art. Again, by "blade", it is meant any thin protrusion or feature extending from a body of a tool or other object. For example, the term blade used herein may refer to an actual blade, such as a circular blade of a concrete saw, or a long thin protrusion, such as the bar of a chainsaw. Typically, the thicknesses of the blades are less than one quarter of an inch, although blades of other thicknesses could also be supported by changing the dimensions of the gripper, according to the guidelines discussed below.

The following is described with respect to FIGS. 1-3. Housing 12 of gripper 10 defines cavity 14 therein. The housing is manufactured by securing portions 16 and 18 together. Piston 20 and plunger 22 are slidingly housed within cavity 14 defined within the housing. Plunger 22 is arranged to extend out from orifice 19 in housing 12. In the shown embodiment, plunger 22 includes pad 24. The pad may be affixed to the plunger by any suitable means known in the art, such as bolts or screws in corresponding bores 25. Pad 24 includes gripping surface 26, which is used to engage against a blade of a saw, for example, for clamping the saw blade in place. Backing surface 27 is included facing gripping surface 26, between which surfaces the blade or other item, represented generally as article 29, would be held. It should be appreciated that in one embodiment, pad 24 is not included and gripping surface 26 is defined as an outer surface of plunger 22 which opposes the backing surface. The gripping surface preferably enables a high coefficient of friction between the article and the gripping surface for creating a sufficient friction force to hold the article firmly in place.

Cam 28 is engaged in orifice 30 of piston 20. The cam is included eccentrically or off-center on shaft 32. That is, the center of the cam is offset with respect to the axis of rotation 34 of shaft 32. This offset defines the eccentricity of the cam. Shaft 32 is secured in housing 12 such that it is rotatable about axis of rotation 34. An impression, comprising impression halves 36A and 36B in housing portions 16 and 18, respectively, is included corresponding to the shape and contours of shaft 32. When the portions of the housing are secured together, the shaft is held in place in the complimentary shaped impression. The shaft may also include lip 38 on one end of the shaft, which sits in a corresponding groove of the impression for further securing the shaft in the housing. The opposite end of the shaft protrudes through the housing and includes lever 42, to facilitate a user rotating the shaft about axis 34.

When shaft 32 is rotated about axis 34 by 180°, then the eccentricity of cam 28 changes the position of piston 20 by a distance designated as distance x in FIG. 2B. It should be appreciated that other ranges of rotation for shaft 32 could be selected. The change of position of the piston transfers to plunger 22 via springs 40. By comparing FIGS. 2A and 2B, it can be seen that the thickness of article 29 causes the portion of cavity 14 between the plunger and piston to narrow. This results in a compression of springs 40, which compression partially determines the force exerted by mechanism 10 on the article.

Specifically, the rotation of shaft 32 causes cam 28 to actuate piston 20 within the housing, since the cam is engaged within orifice 30 of the piston and rotates eccentrically about axis 34. The eccentric rotation of the cam urges the piston to move toward the plunger. Likewise, the change in position of the piston is transferred through spring 40 to cause plunger 22 to extend out from the housing. If there is no article, then the actuation distance of the plunger will be equal to the change of position of the piston (distance x). If an article is being held by the gripper, springs 40 will partially compress a distance proportional to the thickness of the blade, and this compression will cause the springs, via plunger 22, to exert a force on the blade or article. Advantageously, the change of position of piston 20 is transferred to the plunger entirely by springs 40, so that gripper 10 can variably grip blades of different thicknesses without needing to alter the actuation of piston 20 or the degree of rotation of shaft 32 and lever 42. That is, the springs enable a user to actuate the piston fully for any blade, regardless of thickness, and the springs will transmit a suitable force on the blade due to compression of the springs.

It can be seen that the force exerted on a blade can be determined as a function of the compression of the spring times the spring constant of the spring. The compression of the spring is equal to the distance between the backing surface and the gripping surface when gripper 10 is in the open or disengaged position (FIG. 2A), minus the thickness of the article being gripped, minus the distance the piston is displaced (distance x). It should be appreciated that only a negative result following the above formula results in compression, and that a positive number indicates that the blade is too thin to be gripped by the mechanism. By changing these values one can optimize the variables of the gripper as desired. For example, the number of springs and their spring constants, distance between the gripping surface and backing surface, displacement distance of piston 20 and so on, in order to set a minimum and/or maximum range of forces to be exerted by the gripper on a desired range of blade or article thicknesses.

Gripper 10 may include a means for restricting the rotation of shaft 32 and therefore cam 28, to clearly designate when the gripper mechanism is in an engaged or disengaged state. In the shown embodiment, key or tang 44 is engaged with groove 46 in the housing, which encircles only 180° about shaft 32. For example, the gripper may transition from an open or non-actuated position in FIGS. 1 and 2A to an actuated position shown in FIG. 2B by rotating lever 42 180° counter-clockwise with respect to FIG. 1, until tang 44 prevents additional movement. Advantageously, by restricting the rotation of the lever, not only are the engaged and disengaged positions more easily identifiable, but the lever is not interfered with by a blade or other article being gripped. It should be appreciated that other degrees of rotation could be set by the tang and groove and this is only one example.

Gripper 10 may be securable to a bracket, plate, or some other mounting or support means via any suitable means known in the art. In the shown embodiment, housing 12 includes flange 48 including holes 50 for engagement with bolts or screws. In another embodiment, the housing may be cuboidal instead of cylindrical, for mounting the device on a surface arranged along the direction of actuation of the piston and plunger.

The shown embodiment also includes various elements to lock the components together within the housing to ensure consistent smooth actuation of the gripper. For example, the piston is locked to the plunger to prohibit movement or "looseness" of the plunger when in a disengaged stated. The springs urge the plunger out from the housing, but projection 52 including head 54 is included to restrict the movement of the plunger by maintaining a maximum distance between the piston and the plunger so that the piston can not, for example, fall out from the housing, but by not preventing the being urged toward the piston for generating gripping forces. Preferably, head 54 is rectangular, ellipsoidal, or otherwise irregular in shape such that after being inserted through correspondingly shaped hole 55 in the plunger, the head can be rotated so that the head becomes misaligned with the hole and can not be pulled back through the hole without realigning the head with the hole. The head rests in slot 56, which, unlike hole 55, is sized to accommodate head 54, regardless of the orientation of the head.

It should be appreciated that projection 54 could be integrally formed from the piston, or that it could be a separate piece such as a shoulder bolt threadingly secured to the piston. Further, in the shown embodiment, piston 20 includes protrusions 58 engaged in keyway 64 of housing 12, while plunger 22 includes protrusions 60 in keyway 64 of the housing for prohibiting rotation of the piston and plunger inside the housing. It should be appreciated that the plunger and piston could be locked in any manner known in the art that does not prevent the piston from actuating against the plunger. The first and second portions of the housing may be secured together by bolts in bores 62, which comprise, for example, through-bores 62A in the first portion and threaded bores 62B in the second portion. O-rings 37 and 57 may be included to further seal the components together. For example, o-ring 37 could be included about shaft 32 proximate lip 38 while o-ring 57 may be included within the housing about the plunger proximate to orifice 19.

Figure 4:
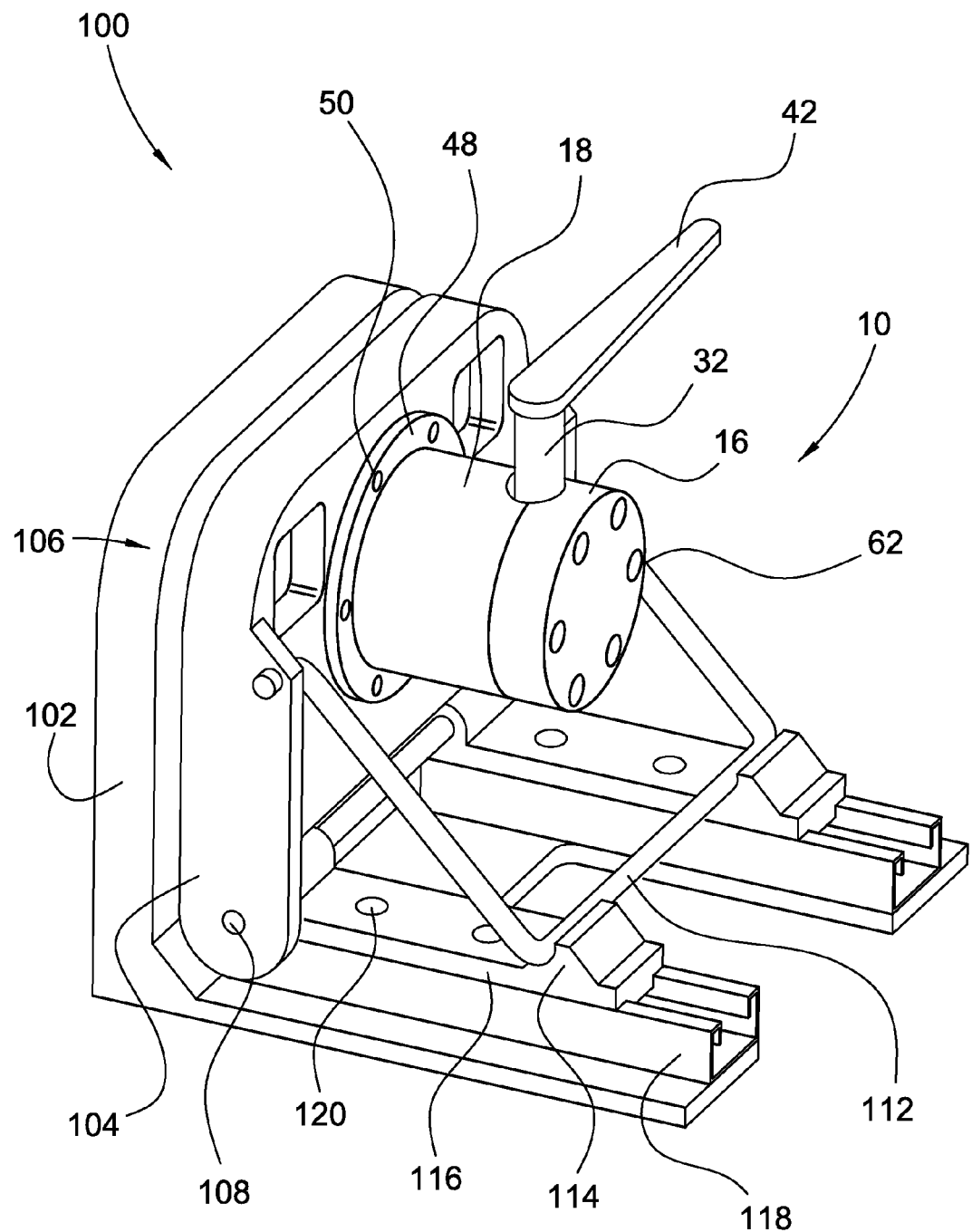
FIG. 4 is a perspective view of an apparatus including the gripper mechanism shown in FIG. 1 in closed position; and, FIG. 5 is a perspective view of an apparatus including the gripper mechanism shown in FIG. 1 in an open position.
Figure 5:
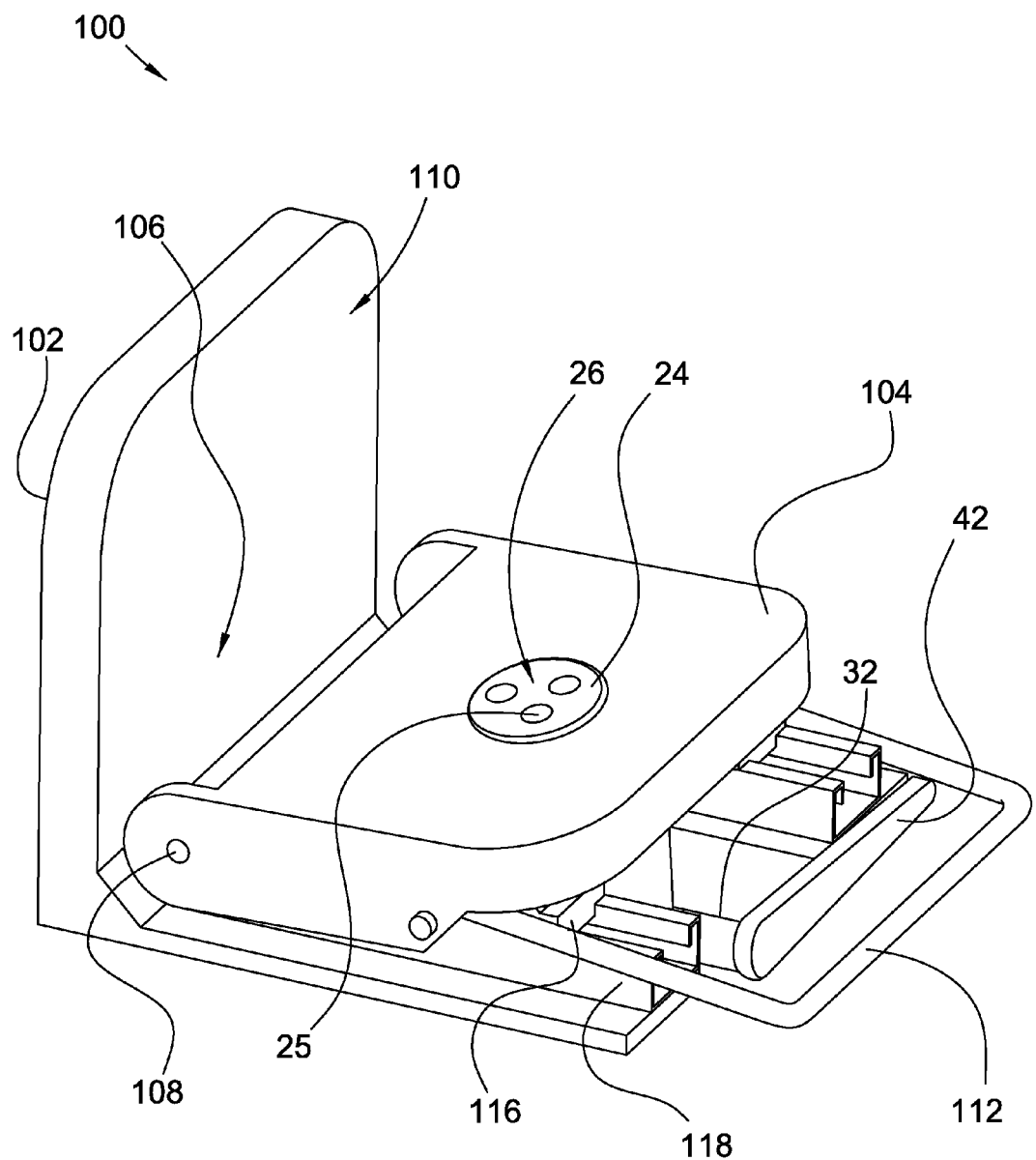

Apparatus 100 is shown in FIGS. 4 and 5 including mechanism 10. Apparatus 100 includes backing plate 102 which includes a backing surface against which mechanism 10 can grip a blade. As discussed above, the backing plate is designed to be rigidly securable to a transport vehicle or for use in some other application which requires the blade of a tool or the like to be gripped. It should be appreciated that the backing plate could be alternatively formed directly from a wall or other component of the vehicle or building in which the device is mounted.

Mounting plate 104 is included to hold mechanism 10 so that the actuation of the plunger of the mechanism is generally perpendicular to the backing surface of backing plate 102. Specifically, flange 48 of mechanism 10 is secured to the mounting plate such as by bolts in bores 50. Thus, it can be seen that a blade is to be inserted into gap 106 between the backing and mounting plates, and mechanism 10 actuated to grip the blade against backing surface 110.

In one embodiment, both the backing plate and the mounting plate may be rigidly and permanently secured in a position similar to that shown in FIG. 4, such that the width of gap 106 is constant. However, in accordance with the shown embodiment, mounting plate 104 may be rotatable for opening gap 106, such as shown in FIG. 5, to facilitate the insertion of a blade or article into the gap. In the shown embodiment, the mounting plate is rotatable by use of a hinge means formed by shaft 108 inserted into sockets in the mounting plate. Locking bar 112 is included to lock the mounting plate, and therefore mechanism 10, at an angle so that the gripping surface of the gripper mechanism and the backing surface are substantially parallel to each other. The locking bar engages with protrusions 114, for example, in legs 116.

With respect to FIGS. 4 and 5, apparatus 100 may also include rails 118 upon which legs 116 are mounted. For example, in one embodiment, legs 114 could be engaged with rails 118 for enabling mounting plate 104 to be slidably repositionable along rails 118. A releasably securing means, such as bolts in bores 120 could be included to lock the mounting plate in a desired position along the rails. Advantageously, this would enable a user to set the width of gap 106 (distance between the backing surface and the gripping surface), so that the gripping force can be set for a variable range of article thicknesses. Alternatively, gripping pads (similar to pad 24) having varying thicknesses could be selectively secured to backing surface 110 to alter the distance between the gripping surface and the backing surface, which would also enable a user to more specifically control the force exerted by mechanism 10 and increase the range of thicknesses which can be gripped by the mechanism.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention. While the current invention is designed for holding a blade like projection of a tool, the item held does not have to be a tool or piece of equipment, and it does not have to be secured in a vehicle. The current invention could just as effectively be used to secure an item in building, such as for protection from earthquakes, vibrations of nearby heavy machinery, or the like.

What I claim is:

1. A mechanism for gripping an article, comprising:
   a housing;
   a piston slidably housed within said housing;
   a plunger slidably housed within said housing, wherein said plunger is at least partially extendable out from said housing, said plunger including a gripping surface;
   at least one spring operatively arranged between said piston and said plunger for relating a change of a position of said piston to said plunger; and,
   a cam eccentrically rotatable about an axis and operatively engaged with said piston for setting said position of said piston.

2. The mechanism recited in claim 1, wherein said piston and said plunger are concentrically aligned within said housing.

3. The mechanism recited in claim 1, further comprising a projection extending from said piston to said plunger, said projection including a head operatively arranged to lockingly engage in a slot of said plunger for setting a maximum distance between said plunger and said piston.

4. The mechanism recited in claim 1, wherein said cam is included on a shaft, and a rotation of said shaft is limited by a tang engaged in a groove in said housing.

5. The mechanism recited in claim 4, wherein said rotation of said shaft is limited to 180°, and wherein said 180° rotation of said shaft causes said cam to shift said position of said piston between an engaged position and a disengaged position.

6. The mechanism recited in claim 1, wherein said plunger includes a pad, said pad comprising said gripping surface, wherein said pad increases a coefficient of friction of said gripping surface.

7. An apparatus for gripping a blade comprising:
a backing plate having a backing surface;
a mechanism according to claim 1; and,
wherein said backing surface opposes said gripping surface of said mechanism and wherein said backing surface and said gripping surface are substantially parallel with respect to each other and form a gap for receiving an article therebetween.

8. The apparatus recited in claim 7 further comprising a hinge means for rotating said mechanism away from said backing plate for facilitating insertion of an article to be gripped between said mechanism and said backing plate.

9. The apparatus recited in claim 7 further comprising at least one rail, said mechanism slidably engaged along said rail for widening or narrowing said gap for accommodating articles of different thicknesses in said gap.

10. An apparatus for gripping an article comprising:
a backing plate having a backing surface;
a mechanism comprising:
    a housing;
    a piston slidably housed within said housing;
    a plunger slidably housed within said housing, wherein said plunger is at least partially extendable out from said housing, said plunger including a gripping surface, wherein said gripping surface opposes said backing surface of said mechanism and wherein said backing surface and said gripping surface are substantially parallel with respect to each other and form a gap for receiving an article therebetween;
    at least one spring operatively arranged between said piston and said plunger for relating a change of a position of said piston to said plunger; and,
    a cam eccentrically rotatable about an axis and operatively engaged with said piston for setting said position of said piston;
a hinge means for rotating said mechanism away from said backing plate for facilitating insertion of an article to be gripped by said apparatus; and,
at least one rail, said mechanism slidably engaged along said rail for widening or narrowing said gap for accommodating articles of different thicknesses in said gap.

* * * * *